US009067273B1

(12) United States Patent
Kim et al.

(10) Patent No.: US 9,067,273 B1

(45) Date of Patent: Jun. 30, 2015

(54) HIGH DENSITY ATMOSPHERIC PLASMA JET DEVICES BY JET-TO-JET INTERACTION

(71) Applicant: Clemson University, Clemson, SC (US)

(72) Inventors: Sung-O Kim, Pendleton, SC (US); Jae-Young Kim, Central, SC (US)

(73) Assignee: Clemson University, Clemson, SC (US)

(*) Notice: Subject to any disclaimer, the term of this patent is extended or adjusted under 35 U.S.C. 154(b) by 96 days.

(21) Appl. No.: 13/893,617

(22) Filed: May 14, 2013

Related U.S. Application Data

(60) Provisional application No. 61/648,276, filed on May 17, 2012.

(51) Int. Cl.
*B23K 10/00* (2006.01)

(52) U.S. Cl.
CPC .................................... *B23K 10/00* (2013.01)

(58) Field of Classification Search
CPC ........ B23K 10/00; B23K 10/003; H05H 1/30; H05H 1/34; H05H 1/46; H05H 2001/4675; H05H 2001/4645; H05H 2001/488; H01J 37/32091; H01J 37/3244; H01J 37/32596
USPC .................. 315/111.21, 111.51; 219/121.36, 219/121.48, 121.51, 121.5, 121.52, 121.59
See application file for complete search history.

(56) References Cited

U.S. PATENT DOCUMENTS 5,977,715 A * 11/1999 Li et al. .................... 315/111.51
6,700,329 B2 * 3/2004 Giapis et al. ............. 315/111.21
7,460,225 B2 * 12/2008 Karanassios .................. 356/316
7,608,839 B2 10/2009 Coulombe et al.
7,806,077 B2 * 10/2010 Lee et al. .............. 118/723 MW
7,845,310 B2 * 12/2010 DiVergilio et al. ......... 118/723 I
8,018,163 B2 * 9/2011 Wi ........................... 315/111.21
8,673,406 B2 * 3/2014 Bicker et al. .................. 427/534
8,710,456 B2 * 4/2014 Klochkov et al. ......... 250/423 R

FOREIGN PATENT DOCUMENTS

WO WO 2005/125287 A2 12/2005
WO WO 2005/125287 A3 12/2005

OTHER PUBLICATIONS

Robert F. Hicks, Ph.D., "Atmospheric Pressure Plasmas: Principles and Operation," Application Notes from Surfx Technologies LLC, 2003, pp. 1-11.

Nie et al., "A two-dimensional cold atmospheric plasma jet array for uniform treatment of large-area surfaces for plasma medicine," *New Journal of Physics*, vol. 11, 2009, pp. 1-14.

* cited by examiner

*Primary Examiner* — Mark Paschall
(74) *Attorney, Agent, or Firm* — Dority & Manning, P.A.

(57) ABSTRACT

Disclosed is an atmospheric pressure plasma jet device for use in a variety of applications. The disclosed system can include a conduit tubing array that includes multiple individual tubes configured in a honeycomb structure. By altering the linear velocity of the system's gas source, the system can produce multiple non-thermal atmospheric plasma jets that can interact in such a way as to create a single plasma jet as opposed to multiple collimated plasma jets. The single jet formed by the interaction of the multiple conduits can exhibit an increased optical intensity and energy compared to either a plasma jet emitted from a single conduit or well-collimated plasma jets emitted from multiple conduits.

24 Claims, 9 Drawing Sheets

HIGH DENSITY ATMOSPHERIC PLASMA JET DEVICES BY JET-TO-JET INTERACTION

CROSS REFERENCE TO RELATED APPLICATIONS

This application claims filing benefit of previously filed U.S. Provisional Patent Application Ser. No. 61/648,276 having a filing date of May 17, 2012, incorporated herein by reference in its entirety.

BACKGROUND OF THE INVENTION

Plasma is an ionized medium that contains many active components including electrons and ions, free radicals, reactive molecules (e.g., ozone, nitric oxide (NO), etc.), and photons. Plasma treatment has been used in materials processing for years to provide desired surface characteristics on plastics, paper, textiles, semiconductor materials and others. The demonstration of atmospheric plasma processes has broadened the field to include treatment of materials that are unsuitable for vacuum processes.

Plasmas are generally categorized as either hot (thermal) or cold (non-thermal) plasma. In a hot plasma, the electrons and heavy particles are in equilibrium with one another and the environment and the temperature of the heavy particles is about equal to that of the electrons. In a cold plasma, the cooling of the heavy particles is more efficient than is the energy flux from the electrons to the heavy particles and the overall temperature of the plasma can remain much cooler than the electron temperature.

Moreover, plasmas can be utilized in either a direct or indirect mode in order to contact a surface to be treated. In the direct mode, the plasma jet itself, which includes the ignited charged and uncharged species, contacts the treated surface, and a significant flux of charge reaches the treatment area. In an indirect plasma treatment, the treatment jet is the downstream afterglow of the ignited plasma plume in which some of the plasma species have become de-excited and have recombined. In an indirect mode, the contacting plasma stream includes mostly uncharged atoms and molecules, with relatively little charge reaching the treatment surface. Although both modes of operation have been shown to be effective, the direct mode can be highly effective in much shorter treatment times.

While atmospheric pressure plasma jet (APPJ) devices, which include a tube with carrier gases and electrodes, have been developed to create non-thermal atmospheric pressure plasmas, such devices are based upon weakly ionized discharge and their emitting intensities are relatively low in comparison to low pressure plasmas created using vacuum chambers.

While the above describes improvement in the art, room for further improvement exists. What is needed in the art is an atmospheric pressure plasma jet device that can exhibit an increased optical intensity and that can be used in applications requiring high energetic plasmas.

SUMMARY OF THE INVENTION

In accordance with one embodiment of the present disclosure, a plasma jet system is disclosed. The plasma jet system can include a gas source that provides a plasma feed gas; a conduit tubing array formed of a dielectric material, the array having an outer surface and comprising multiple hollow tubes each having a first end, wherein the first end of each hollow tube is in fluid communication with the gas source, and a second end; and an electrode adjacent to the outer surface of the conduit tubing array.

Also disclosed are methods for treating a surface with a plasma jet system. For instance, in one embodiment, the method can comprise forming a plasma within a conduit tubing array, wherein the conduit tubing array has an outer surface and comprises multiple hollow tubes each having a first end and a second end. The plasma can be generated from a plasma feed gas and in an electric field developed at an electrode adjacent to the outer surface of the conduit tubing array, wherein the conduit tubing array forms a dielectric barrier between the electrode and the plasma feed gas. The plasma can exit the second end of each of the hollow tubes as a single plasma jet, after which the single plasma jets interact to form a single, intense mode plasma jet, or as multiple, well-collimated plasma jets. The method further includes directing the intense mode plasma jet at the surface.

Other features and aspects of the present invention are set forth in greater detail below.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION OF PREFERRED EMBODIMENTS

Reference will now be made in detail to various embodiments of the disclosed subject matter, one or more examples of which are set forth below. Each embodiment is provided by way of explanation of the subject matter, not limitation of the subject matter. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment. Thus, it is intended that the present disclosure cover such modifications and variations as come within the scope of the appended claims and their equivalents.

An atmospheric pressure plasma jet (APPJ) device can include a tube with carrier gases and electrodes, and can be used for creating non-thermal atmospheric pressure plasmas for treating various surfaces, such as by etching. However, conventional APPJs are based on weakly ionized discharge and their emitting intensities are relatively low, as discussed above. Because such deficiencies can limit the diversity of applications for which these plasma jets have been used, efforts have been focused on increasing the discharge rate of plasmas at one atmospheric pressure by plasma jet focusing. For instance, if the plasma jet from a single plasma jet device is proximate to other single plasma jet devices through an arrayed structure of multiple conduits, the collections of charged particles can interact with each other at certain discharge conditions, thus affecting the discharge behavior in a collective manner. As such, these plasma jets discharging adjacent to each other can ultimately bundle together to form a strongly coupled Coloumb system.

In general, disclosed herein are plasma jet systems formed from multiple conduits to increase the optical intensity and energy of the plasma jet that ultimately reaches a surface to be treated. According to the present disclosure, atmospheric plasma jet devices are described that can provide for improved optical intensity of a formed plasma on a surface to be treated based on an intense mode plasma jet formed by direct jet-to-jet coupling from an array of tubes. Disclosed systems can be economically and easily fabricated. A system can be maintained at low cost and can be portable.

Figure 1:
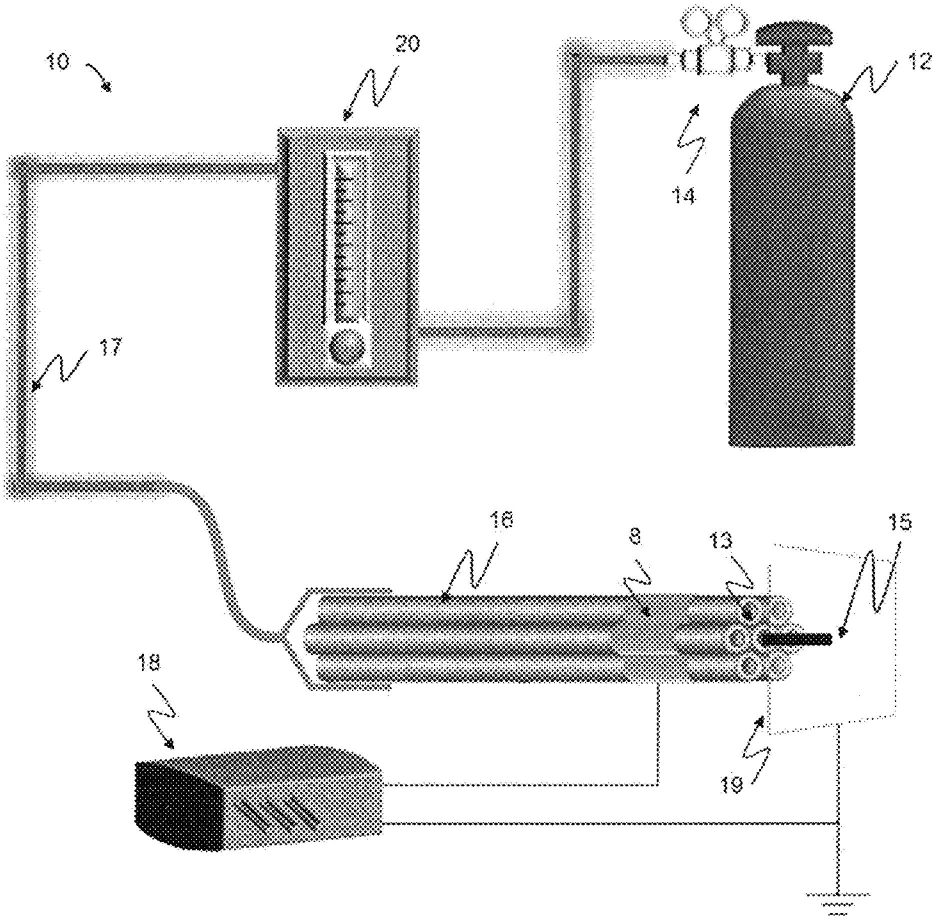
FIG. 1 schematically illustrates one embodiment of a system as disclosed herein.

FIG. 1 is a schematic illustration of one embodiment of a system 10 as disclosed herein. System 10 includes a gas source 12, which can provide a plasma feed gas at atmospheric pressure. The feed gas used to form the reactive plasma can be any gas or mix of gases as desired. In general, a plasma feed gas can exhibit high-frequency excitation that favors the formation of a non-thermal plasma at atmospheric pressure under excitation conditions. By way of example, the plasma feed gas can include helium and/or argon.

A plasma feed gas can be combined with one or more additional gases that can provide reactive species to the formed plasma. An additional gas can be provided with the plasma feed gas in gas source 12 or can be combined with the gas flow downstream from the gas source 12 and fed into conduit tubing array 16 prior to or at electrode 8. For instance, a second feed line can carry an additional gas to the plasma feed gas as described in U.S. Pat. No. 7,608,839 to Coulombe, et al, which is incorporated herein by reference. In general, an additional gas can be utilized in relatively small amounts (e.g., less than about 3% v/v) and can provide additional reactive species in the formed plasma. For example, oxygen and/or nitrogen can be combined with the plasma feed gas.

Gas source 12 can feed a plasma forming gas to through tubing material 17 to a first end of each of the multiple tubes that form conduit tubing array 16 by use of suitable control devices such as a pressure regulator 14 and/or a purge meter 20. Other flow control devices including valves, flow controllers, and so forth can be incorporated into disclosed systems according to standard practice. The gas flow from gas source 12 can be adjusted such that the linear gas velocity can range from about 1 meter per second (m/s) to about 100 m/s, such as from about 4 m/s (m/s) to about 20 m/s depending on the desired application and diameter of each of the tubes in the conduit tubing array. For instance, if a single, intense mode plasma jet is desired from a 7-tube conduit array, the linear gas velocity can be adjusted to about 4.6 m/s to about 10.6 m/s. This can correspond to a gas flow rate of about 1500 sccm to about 3500 sccm, or about 1.5 slm to 3.5 slm. Meanwhile, if multiple, well-collimated plasma jets are desired from such a 7-tube conduit array, the linear gas velocity can be adjusted to about 10.6 m/s to about 20 m/s. This can correspond to a gas flow rate of about 3500 standard cubic centimeters per minute (sccm) to about 15,000 sccm, or about 3.5 standard liters per minute (slm) to about 15 slm. Hence, if a single, intense mode plasma jet is desired, the linear gas velocity and gas flow rate are lower than if multiple, well-collimated plasma jets are desired. Nevertheless, it is to be understood that the plasma jet arrays can vary between intense mode and well-collimated mode by jet-to-jet coupling effect based on adjustment of the plasma parameters such as voltage, gas flow rate, and distance between the device and the counter electrode (ITO electrode) in the same device. If less or more tubes are used to form the conduit tubing array 16, it is to be understood that the gas flow rate and linear gas flow velocity may need to be adjusted accordingly depending on how the individual jets interact with each other. For instance, if more tubes are used to form the conduit tubing array, the gas flow rate may be higher than if less tubes are used. As more tubes are used to form the conduit tubing array 16, the cross-sectional area of the array effectively increases, and thus the higher gas flow rate can compensate for this increase in surface area so that an adequate gas velocity is obtained.

Conduit tubing array 16 can carry the feed gas past electrode 8, which is wrapped around conduit tubing array 16. The conduit tubing array 16 can be formed from several individual tubes each of which can be formed from a dielectric material. The multiple tubes can be arranged in a honeycomb-like structure at least at the area extending from electrode 8 to conduit tubing apertures 13 at a second end of the tubes. For instance, the conduit tubing array 16 can be formed of multiple quartz glass (silica) tubes, glass tubes, or a combination thereof at least at the area extending from electrode 8 to conduit array apertures 13. Meanwhile, the tubing material 17 that is connected to gas source 12 can be formed from a flexible material, as shown in FIG. 1. Such tubing material 17 can be a material that can contain and direct a formed plasma without excessive deterioration, so as to increase the life of a device. For example, a portion of the tubing between the gas source 12 and electrode 8 can be formed of a flexible tubing material 17 that is polymeric. Examples of suitable materials include, without limitation, silicone, polyurethane, polyethylene, polyvinyl chloride, and fluorinated polymers (e.g., polyvinyldifluoride, Teflon®, etc.), polyetherether ketone (PEEK), polysulfone, and so forth.

The number of tubes used in the conduit tubing array 16 can vary, such as from about 3 to about 19 or greater, such as from about 3 to about 100, such as from about 3 to about 200.

Figure 8A:
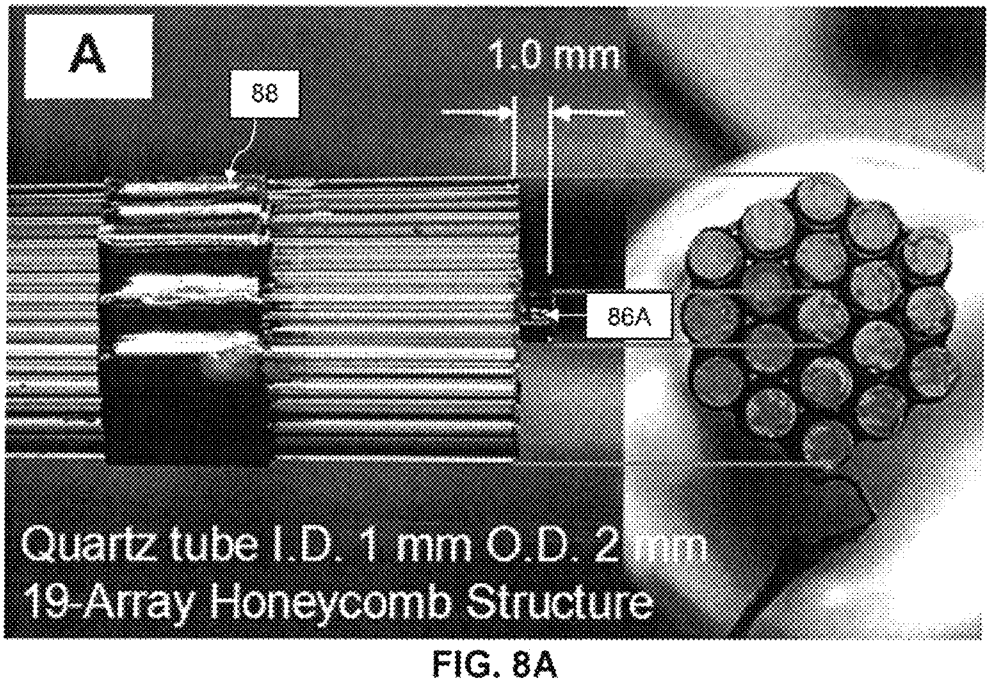
FIG. 8A is a photograph of a side view and a front view of a 19-conduit array with a honeycomb structure.

For example, the individual tubes can be arranged in a honeycomb structure such that 6 outer tubes surround a center tube, thus utilizing a total of 7 tubes. In one embodiment, the end of the central individual tube can protrude out farther than the outer tubes, such as by about 0.1 millimeter to about 1 meter, such as by about 0.25 millimeters to about 0.5 meters, such as by about 0.5 millimeters to about 1.5 millimeters, such as by about 1 millimeter, for easy ignition, as shown in FIG. 8A, where central tube 86A protrudes out farther from electrode 88 as compared to the 18 outer tubes (not labeled). In one embodiment where smaller device is desired, the dimensions of the individual tubes in the conduit tubing array 16 can each have an inner diameter of from about 0.75 millimeters to about 1.25 millimeters, such as about 1 millimeter. The individual tubes in the conduit tubing array can each have an outer diameter of from about 1.5 millimeters to about 2.5 millimeters, such as about 2 millimeters. This corresponds with the conduit tubing array having an overall diameter of from about 4.5 millimeters to about 7.5 millimeters, such as about 6 millimeter when 7 individual tubes are utilized. The center-to-center distance between two adjacent tubes can be from about 2.2 millimeters to 2.6 millimeters, such as about 2.4 millimeters, which can be increased due to the thickness of the electrode 8 that surrounds each tube. It is to be understood, however, that each of the tubes in the conduit tubing array 16 can be of any suitable size such that the overall diameter of the conduit tubing array can be as large as 50 meters, depending on the application. For instance, in some applications, such as military applications, the conduit tubing array can have an overall diameter that ranges from about 0.01 meters to about 40 meters, such as from about 0.5 meters to about 30 meters, which will correspond with a plasma feed gas linear velocity on the higher end of the ranges described above. Further, this can correspond with individual tubes each having an inner diameter of from about 1 millimeter to about 10 meters, such as from 10 millimeters to about 5 meters. Moreover, the individual tubes can each have an outer diameter of from about 1.1 millimeters to about 20 meters, such as from about 15 millimeters to about 10 meters.

Meanwhile, the electrode 8 can be formed from any suitable material, such as, for instance, copper tape. The electrode 8 can be positioned adjacent to an outer surface of the conduit tubing array 16 and can extend along the conduit tubing array 16 such that it has a length of about 4 millimeters to about 8 millimeters, such as about 6 millimeters, when a smaller device is desired, although it is to be understood that the electrode can have a length that ranges from about 1 millimeter to about 1 meter, such as from about 2 millimeters to about 0.5 meters depending on the application. The electrode 8 can be placed along the conduit tubing array 16 such that the distance between the end of the electrode 8 that is closest to the conduit array apertures (i.e., the individual tubing openings at the second end) 13 is from about 1 millimeter to about 100 millimeters, such as from about 4 millimeters to about 50 millimeters, such as from about 8 millimeters to about 12 millimeters, such as about 10 millimeters.

The electrode 8 can be powered by a driving circuit 18. Driving circuit 18 can apply a voltage of between about 1 kV and 1000 kV, such as from about 2.5 kV to about 500 kV, such as from about 5 kV and about 15 kV in peak value, for instance about 9 kV in peak value. The voltage of the drive force can be applied at a frequency of from about 10 kHz to about 100 kHz, such as from about 25 kHz to about 50 kHz, such as about 32 kHz. Additionally, the driving circuit can function at a power consumption of 20 W-40 W, such as from about 25 W to about 30 W, such as about 28 W. However, it should be understood that the preferred characteristics of the drive circuit can depend upon the specific system design and the gas utilized to form the plasma.

Plasma can be generated in conduit tubing array 16 in the electric field developed at the electrode 8. The plasma can then be emitted from conduit array apertures 13 and form a plasma jet 15 that extends from conduit tubing array 16 to a treatment surface or plate 19. Because the plasma of jet 15 is generated within conduit tubing array 16 and the dielectric material (e.g., quartz glass or silica tubes) of conduit tubing array 16 prevents contact between the electrode 8 and the plasma, the system is of the type known as a dielectric barrier discharge (DBD) jet system. This can increase the life of the system, as contact between plasma and an electrode of the system can lead to deterioration of the electrode.

Figure 2A:
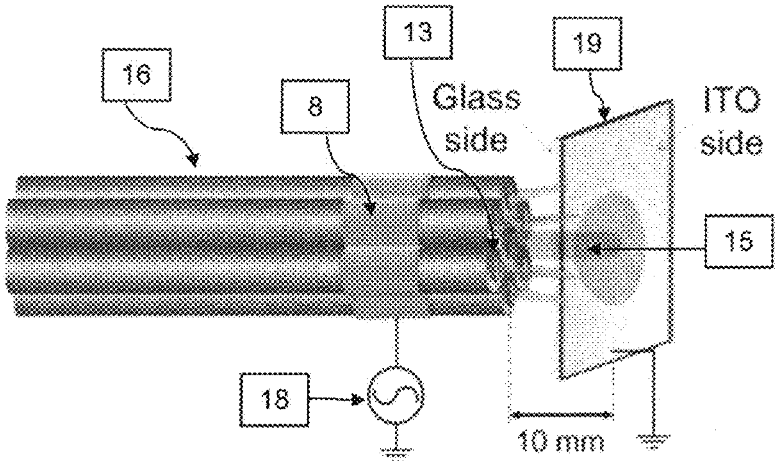
FIG. 2A illustrates a side view of a 7-conduit array within which plasma may be formed and delivered to a targeted surface as a single intense mode plasma jet.
Figure 2B:
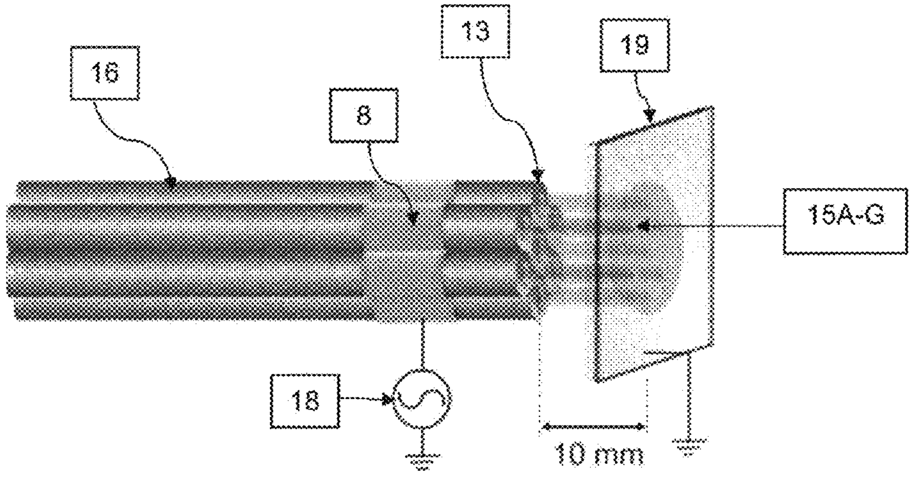
FIG. 2B illustrates a side view of a 7-conduit array within which plasma may be formed and delivered to a targeted surface as multiple, well-collimated mode plasma jets.

Next, FIGS. 2A-2B show the device of FIG. 1 in use to create two types of plasma jets from a 7-tube conduit tubing array 16 based on variations in operating conditions, which are discussed in more detail below in reference to the examples. The plasma jets can be used to etch one side of a plate 19 or other object, such as the glass side of a plate coated with indium tin oxide (ITO). The plate can be placed from about 1 millimeter to about 10 meters away, such as from about 2 millimeters to about 1 meter away, such as from about 5 millimeters to about 15 millimeters away, such as from about 10 millimeters away, from the end of the conduit array apertures 13 (i.e., the second end of each of the tubes). Further, the plate 19 can have a thickness of from about 0.5 millimeters to about 1.5 millimeters, such as about 0.8 millimeters.

First, FIG. 2A illustrates a side view of a conduit tubing array 16 that utilizes 7 individual conduit tubes that are formed into a honeycomb-like structure. Based on the operating conditions chosen, a single, intense mode plasma jet 15 has been formed in order etch the glass side of plate 19. Next, FIG. 2B also illustrates a side view of a conduit tubing array 16 that utilizes 7 individual conduit tubes that are formed into a honeycomb-like structure. In contrast to the single, intense mode plasma jet 15 of FIG. 2A, based on the operating conditions chosen, multiple, well-collimated plasma jets 15A-15G have been formed in order to etch the glass side of plate 19.

Devices and methods as disclosed herein may be better understood with reference to the following examples.

EXAMPLE 1

Figure 3A:
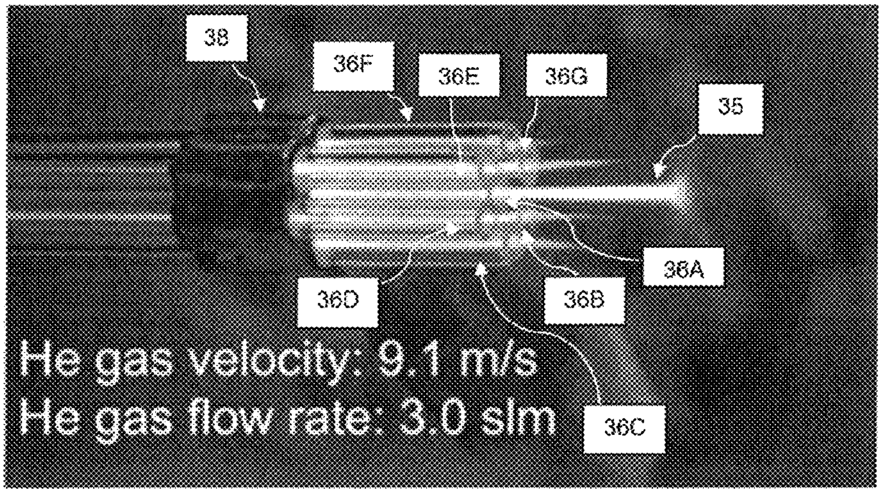
FIG. 3A is a photograph of a device of FIG. 2A emitting a single, intense mode plasma jet.
Figure 3B:
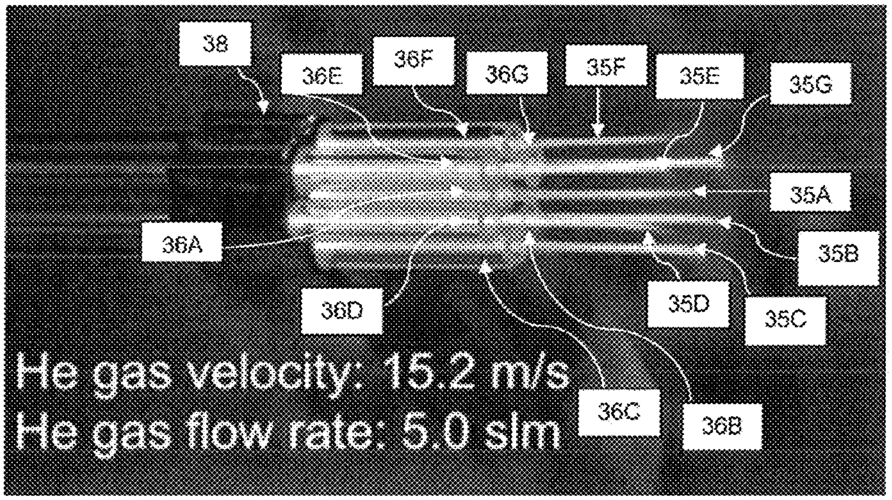
FIG. 3B is a photograph of a device of FIG. 2B emitting multiple well-collimated mode plasma jets.

Example 1 refers to FIGS. 3A and 3B, which both show the etching of the glass side of an ITO glass plate spaced about 10 millimeters away from the end of 7-tube conduit tubing array via the use of high purity (99.999%) helium gas discharge process. During the discharge process, in order to observe the input electrical energy, the voltage and current waveforms emanating from the powered electrode 38 were measured using a high voltage probe (Tektronix P6015A) and a current monitor (Pearson 4100). An inverter circuit was used to amplify a low primary voltage to a high secondary voltage.

In both FIGS. 3A and 3B, the driving circuit 18 (see FIGS. 1, 2A, and 2B) was configured to apply a sinusoidal voltage of about 9 kV in peak value at a frequency of about 32 kHz. Meanwhile, the input power in both systems was about 28 W. For FIG. 3A, where a single, intense mode plasma jet 35 is observed, the helium gas velocity was about 9.1 m/s and the helium gas flow rate was about 3000 sccm (3.0 slm). Meanwhile, for FIG. 3B, were multiple, well collimated plasma jets 35A-35G were observed, the helium gas velocity was about 15.2 m/s and the helium gas flow rate was about 5000 (5.0 slm).

A photo sensor amplifier (Hamamatsu C6386-01) was used to observe plasma emissions. The wavelength-unresolved optical emission waveform from the photo sensor amplifier encompassing the wavelength ranges of 400-1100 nm was then plotted on an oscilloscope (Tektronix TDS3014C). In the front of the photo sensor amplifier, an optical slit of 1 mm in width was used to obviate external environmental light. A fiber optic spectrometer (Ocean Optics USB-4000-UV-VIS) was employed to identify the miscellany of reactive species and to estimate the electron energy in the single, intense mode plasma jet of FIG. 3A and in the multiple, well-collimated plasma jets of FIG. 3B.

First, as can be seen from a comparison of FIGS. 3A and 3B, the helium gas velocity and the helium gas flow rate could be varied to control the type of plasma jet formed. It should be pointed out that at linear helium gas velocities up to 4.6 m/s, with a corresponding glass flow rate of 1500 sccm (1.5 slm), the plasma jet from the conduit tubing array did not reach the plate. Meanwhile, at helium gas velocities ranging from 4.6 m/s to 10.6 m/s, with a corresponding glass flow rate of 1500 sccm (1.5 slm) to 3500 sccm (3.5 slm), the plasma jet was highly concentrated at the center quartz glass tube so that an intense mode plasma jet 35 was formed, as shown in FIG. 3A. A concentrated plasma jet with a stronger plasma emission was observed under these conditions.

An increase in the linear velocity of the helium gas to 10.6 m/s or over, and an increase in the corresponding gas flow rate above 3500 sccm (3.5 slm), transformed the plasma jet into seven well-collimated plasma jets 35A-G, as shown in FIG. 3B. Although the gas flow became turbulent at extremely large flow rates of helium gas, such as at 15,000 sccm (15 slm) or over, thus causing unstable discharges, the 7 well-collimated plasma jets were still well aligned and parallel to each other.

By varying the helium gas velocity, different modes of plasma jets could be observed, as discussed above. First, as shown in FIG. 3A, when the gas velocity was 9.1 m/s, which corresponds to a gas flow rate of 3000 sccm (3 slm), a singe intense mode plasma jet was formed. The outer quartz glass tubes surrounding the central quarts glass tube, however, did not produce strong individual plasma jets and instead reinforced the central plasma jet, despite the presence of an equally distributed gas flow. These results were confirmed through direct observation of a much more incandescent plasma jet at the central tube of the array rather than separate, well-collimated plasma jets produced from each individual tube. The six outer plasma jets were weakened in this embodiment, however, indicating that an intense mode plasma jet 37 is driven by direct jet-to-jet coupling in the air. In contrast, FIG. 3B shows that seven well-collimated plasma jets are present when the gas velocity is 15.2 m/s, which corresponds to a gas flow rate of 5000 sccm (5 slm). The plasma jets from the seven tubes were well aligned and parallel to each other in such an embodiment.

As determined from Example 1, each single plasma jet from one of the seven tubes 36A-G as part of the conduit tubing array must be close enough to each other for easy interaction in order to form an intense mode plasma jet. Further, the device must have a single powered electrode configuration 38 and a ground electrode (i.e., at ITO glass plate 19 as shown in FIGS. 2A and 2B) that is spaced about 10 mm away from the conduit tubing array apertures. Further, the gas flow rate should be from about 1500 sccm (1.5 slm) to about 3500 scorn (3.5 slm) because when the gas flow rate is greater than about 3500 sccm (3.5 slm), the plasma jets can no longer interact with each other, but are rather transformed into well-collimated plasma jets regardless of operating voltage.

Figures 4A, 4B, 4C, 4D:
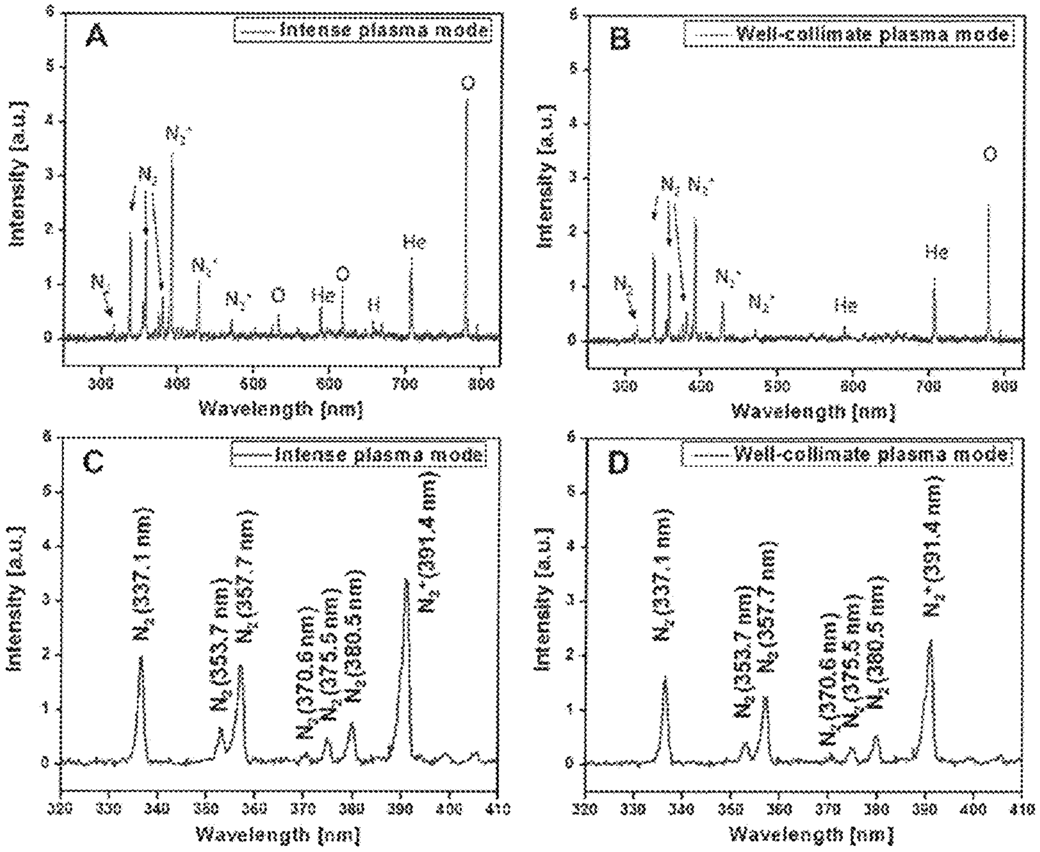
FIGS. 4A-4B are graphs comparing the optical emission spectra of a single, intense mode plasma jet with multiple, well-collimated mode plasma jets from a conduit array.
FIGS. 4C-4D are graphs comparing the magnified emission spectra of the second positive systems and first negative system of nitrogen of an intense mode plasma jet with well-collimated mode plasma jets.

Next, the optical emission spectra (OES) method was used to investigate the atoms, ions, and molecules in the plasma jets of FIGS. 3A and 3B. In order to verify the reactive species generated by the intense helium gas APPJ in the ambient air, the emission spectra of the intense mode plasma jet of FIG. 3A was compared with the emission spectra of the well-collimated plasma jets of FIG. 3B. The emission spectra of the two different plasma jets were monitored and compared using a fiber optic spectrophotometer in which the distance between the end of the device and the spectrophotometer was fixed at 10 mm. FIG. 4A shows the optical emission spectra of an intense mode plasma jet (lower gas velocity and flow rate), while FIG. 4B shows the optical emission spectra of a well-collimated plasma jet (higher gas velocity and flow rate).

For example, FIGS. 4A and 4B show the emission spectra from 300 nm to 800 nm for the two different plasma jets, further indicating the excited $N_2$, $N_2^+$, He, H, and O exist in both plasma jets. As can be seen from FIGS. 4A-4B, the intense mode plasma jet and well-collimated mode plasma jets resulted in different optical emission spectra at the surface to be treated. For instance, the optical emission spectra of the intense mode plasma jet exhibited strong intensity levels of nitrogen and oxygen species that are highly reactive radicals compared to the spectra for the well-collimated plasma jets. Further, the emission spectra of the intense plasma jet only exhibits the oxygen atomic lines at 533 nm and 615 nm, and the hydrogen atomic line at 656 nm, which is likely due to humidity from the air. These results imply that the higher emission of the intense plasma jet is indicative of not only stronger atomic intensity levels, but also an improved discharge rate.

In order to determine if the intense mode plasma jet of the present disclosure exhibited higher electron energy than the well-collimated plasma jets, the properties of electron energy of the two different plasma jet configurations were characterized and compared by peaks of both first negative and second positive systems of nitrogen using OES. FIG. 4C shows the magnified emission spectra of the second positive systems and first negative system of nitrogen for an intense mode plasma jet, and FIG. 4D shows the same for the well-collimated mode plasma jets. The nitrogen molecule is transferable from the ground state $N_2(X^1\Sigma_g^+)$ into an excited state $N_2(C^3\pi_u)$ by the impact of electrons with an energy greater than 11.0 eV. Subsequently, the excited nitrogen molecules $N_2(C^3\pi_u)$ are transferred into the $N_2(B^3\pi_g)$ state by emitting a proton of 337.1 nm in wavelength. If electrons exhibit energy greater than 18.7 eV, nitrogen ions $N_2^+(B^2\Sigma_u^+)$ will be produced that release photons of 391.4 nm in wavelength via transfer into the $N_2^+(X^2\Sigma_g^+)$ state. Based on these different emitting procedures of nitrogen, the relative changes in the concentration of active species $N_2(C^3\pi_u)$ and $N_2^+(B^2\Sigma_g^+)$ in the two different plasma jet modes can be monitored by measuring the emission intensities at 391.4 nm and 337.1 nm. The normalized emission intensity at 391.1 nm (emission intensity at 391.4 nm divided by an emission intensity at 337.1 nm) of the intense mode plasma jet is revealed to be 1.5 times greater than that of the well-collimated plasma jets (i.e., the normalized emission intensities at 391.1 nm indicate that the electron energy of the intense mode plasma jet is relatively greater than that of the well-collimated plasma mode).

EXAMPLE 2

Example 2 investigates the concentration phenomena of the plasma jets by the direct jet-to-jet coupling among the adjacent plasma jets and compares the conduit tubing array plasma jets to a plasma jet emitted from a single conduit tube.

More specifically, the optical intensity from an intense mode plasma jet emitted from a conduit tubing array of 7 individual tubes, well collimated plasma jets emitted from a conduit tubing array of 7 individual tubes, and a plasma jet emitted from a single tube were compared.

As an initial matter, the plasma jet-to-jet coupling behavior is thought to be caused not by optical or chemical coupling, but by the electrical coupling of the charged particles. The plasma jet-to-jet coupling behavior can be attributed to the use of one common ground electrode. When the seven individual plasma jets propel toward the one common ground electrode, the produced charged particles from the individual plasma jets merge to each other and concentrate along a certain discharge path between the powered and ground electrodes.

Figure 5:
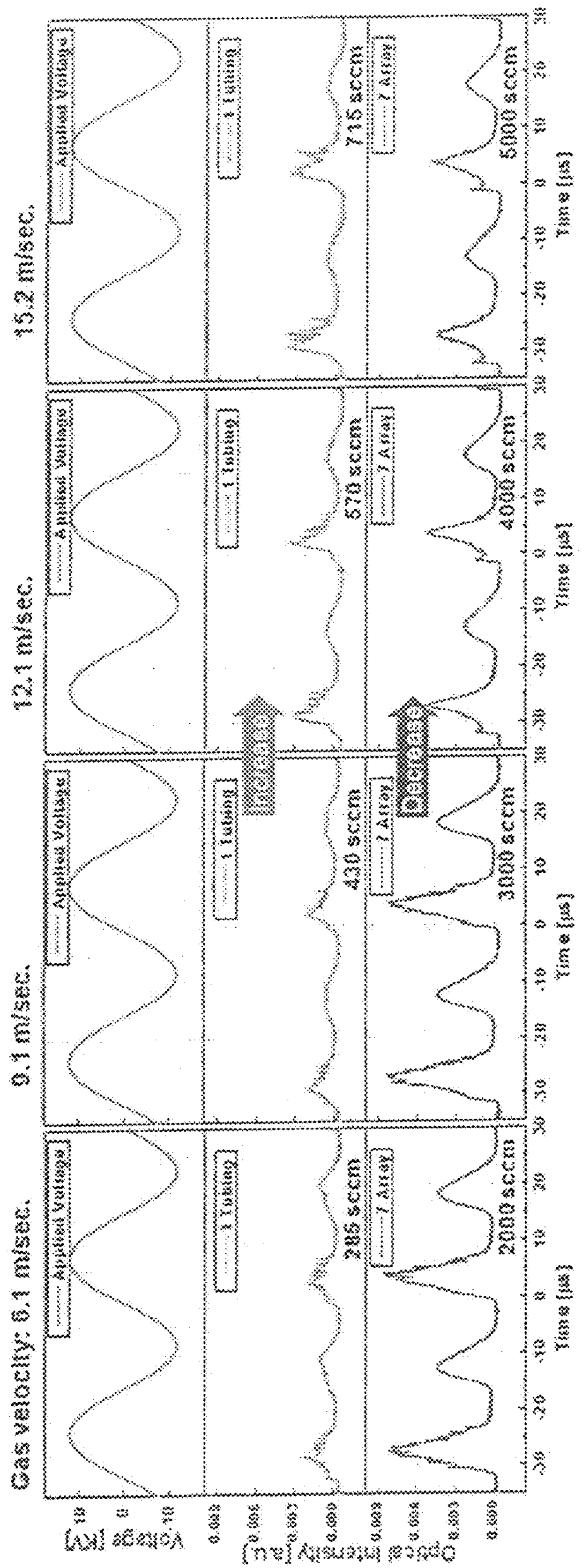
FIG. 5 is a graph comparing the optical intensity of an intense mode plasma jet emitted from a 7-tube conduit tubing array, a well-collimated mode plasma jet emitted from a 7-tube conduit tubing array, and a plasma jet emitted from a single tube conduit.
Figure 6:
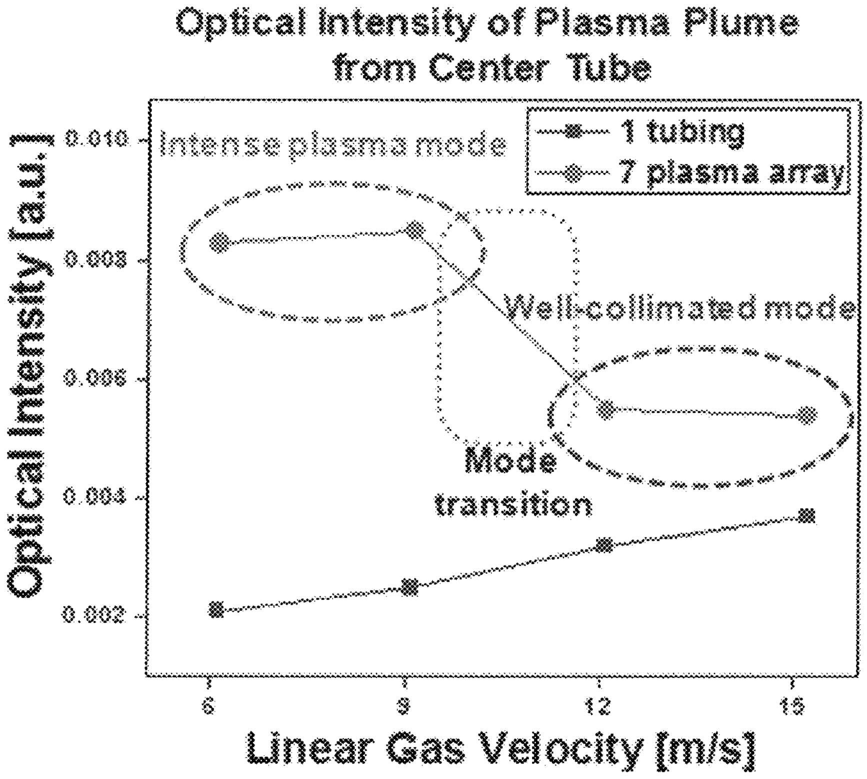
FIG. 6 is another graph that summarizes the optical intensity of an intense mode plasma jet emitted from a 7-tube conduit tubing array and a plasma jet emitted from a single tube conduit.

In order to investigate the concentration phenomena of the plasma jets formed by the 7-tube conduit tubing array (intense mode and well-collimated) as compared to a single conduit tube, the plasma emission properties in terms of the optical intensity as a function of helium linear gas velocity, as based on the gas flow rate, as shown in the graphs of FIGS. 5 and 6, were examined. When comparing the characteristics of the various plasma jets, the single quartz glass tube plasma jet device was identical to one of the seven individual tubes in the conduit tubing array. In this example, the applied input power was fixed to 28 W, and the plasma emissions from the 7-tube conduit tubing array and the single conduit tube were monitored as an increase of the linear gas velocity. Under the same power conditions, the applied sinusoidal voltage waveforms were the peak value of 10 kV and 11 kV for the conduit tubing array device and the single conduit tubing device, respectively, due to the impedance difference of the two plasma devices. The photo sensor having a 1 mm wide optical slit was aligned with the positions of the centered plasma jet from the conduit tubing array and the plasma jet of the single conduit tubing. As a result, the optical intensity of the plasma emission in both the array and single conduit tube exhibited different tendencies with an increase of gas velocity, as shown in FIG. 5. Since no jet-to-jet coupling was observed in the single conduit tubing plasma jet, the optical intensity increased with a corresponding increase in the linear gas velocity. Meanwhile, the optical intensity of the centered plasma jet from the conduit tubing array abruptly decreased between the gas velocities of 9.1 m/s and 12.1 m/s.

FIG. 5 shows the optical intensity of a plasma emission of a single tube plasma jet as well as the 7-tube conduit tubing array device at linear gas velocities at 6.1 m/s, 9.1 m/s, 12.1 m/s and 15.2 m/s, which corresponded to gas flow rates of 2000 sccm (2 slm), 3000 sccm (3 slm), 4000 sccm (4 slm), and 5000 sccm (5 slm), respectively. Regarding the single tube plasma jet device, the corresponding gas flow rates at the same linear gas velocities were 285 sccm (0.285 slm), 430 sccm (0.430 slm), 570 sccm (0.570 slm), and 715 sccm (0.715 slm), respectively, as shown in FIG. 5.

The optical intensity of plasma emission in rising slope of the voltage waveform is shown to be higher than that in the falling slope in both the single tube conduit and the conduit tubing array. This difference of the optical intensities is caused by the different shapes between the powered and ground electrodes. The disclosed plasma system, which consists of the plasma conduit tubing array with a single electrode configuration and an outside ground electrode, can be classified as a point-to-plane discharge configuration. The difference of the optical intensities between rising and falling slopes of the voltage waveform is a stereotypical discharge property of point-to-plane barrier discharges driven by ac voltages. The streamer-like discharge mode occurs in the positive half-period and the diffuse-like discharge mode occurs in the negative half-period. Therefore, when the powered electrode 8 (see FIG. 1) plays a role of an anode and the ITO plate (ground electrode) 19 (see FIGS. 2A and 2B) plays a role of a cathode, stronger plasmas are generated than vice-versa.

As shown in FIG. 5 and summarized in FIG. 6, the optical intensity increased by 85% with an increase in the gas velocity from 6.1 m/s to 15.2 m/s for the plasma jet discharged from a single tube conduit, but the optical intensity of the plasma jet discharged from the 7-tube conduit tubing array decreased by 40%. Meanwhile, at a gas velocity of 9.1 m/s, the optical intensity of the 7-tube conduit tubing intense mode plasma jet array was about four times larger than single conduit tube plasma jet, despite identical power and gas conditions. At a linear gas velocity of 9.1 m/s, the seven individual plasma jets that formed the conduit tubing array begin to interact with each other under this precise condition to reinforce the central plasma jet by this coupling effect, while the six outer plasma plumes were weakened. The three pairs of outer quartz glass tubes facing each other that surround the central quartz tube plus the central tube yield an optical intensity that is four times greater than in previous experimentation, as shown in the graph of FIG. 6.

Interestingly, at a gas velocity of 15.2 m/s, which increased velocity corresponds with seven well collimated plasma jets as opposed to a single intense mode plasma jet, the optical intensity of the central plasma jet is still 1.4 times greater than the single tube plasma jet, despite identical power and gas conditions. Though this increase does not occur in the jet-to-jet coupling phenomenon in the well-collimated mode within the seven plasma plumes, there is electrical coupling of charged particles between closed adjacent plasma plumes, thus enhancing slightly the plasma emission. There are increases in the amplitudes of the produced plasma emission at not only the rising slope but also the falling slope of the input voltage in the intense plasma mode as shown in FIG. 5. Since the operating voltage condition ($V_p$=10 kV and Frequency=32 kHz) is not changed with the plasma mode transition, this higher emission in the intense plasma mode is indicative of both a greater maximum intensity, and an improved average discharge rate than the well-collimated plasma mode.

EXAMPLE 3

Figure 7:
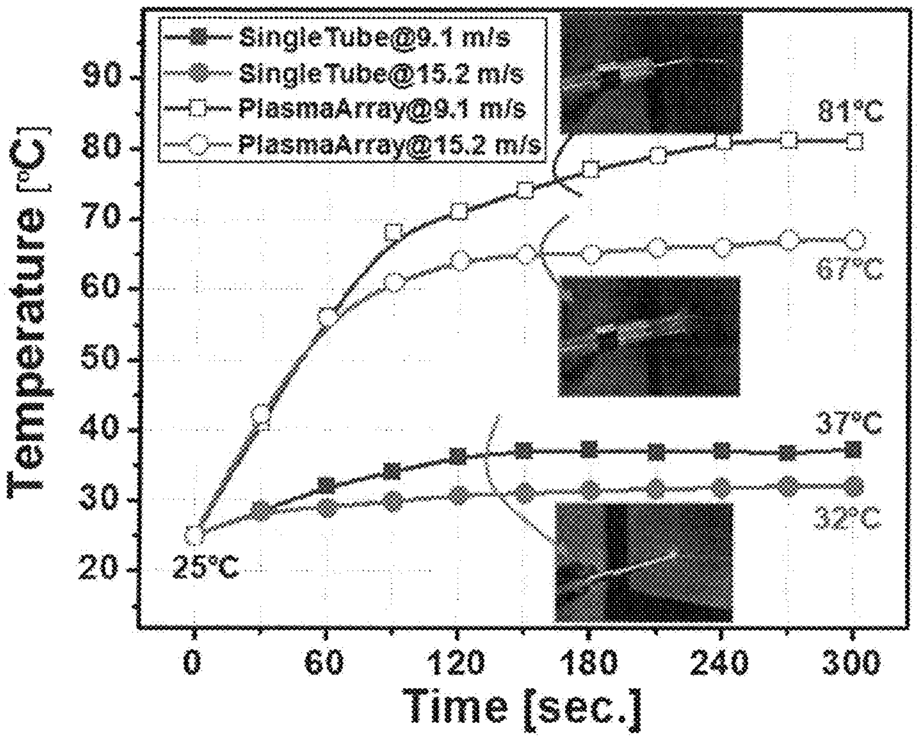
FIG. 7 is a graph showing the temperature variation of a treated surface when an intense mode plasma jet from a 7-tube conduit tubing array, a well-collimated mode plasma jet from a 7-tube conduit tubing array, and a plasma jet from a single tube conduit reach a surface to be treated.

Next, the temperature variation of the ITO glass plate 19 (see FIGS. 2A and 2B) as a function of time for each of the three plasma jet configurations discussed above (intense mode conduit tubing array, well-collimated conduit tubing array, and single tube conduit) was investigated, as shown in FIG. 7. FIG. 7 is a graph illustrating the temperature variation of the surface of ITO glass as a function of time when the plasma jet makes contact with the glass side of the ITO glass electrode. The applied input power was fixed to 28 W at a frequency of 32 kHz. The ITO glass temperatures were then measured using an infrared thermometer (Extech IR Thermometer 42545) with the measuring point being the center of the plasma jet on the glass surface of the ITO glass. The initial ITO glass temperature was 25° C. Regarding the plasma jet emissions from the single conduit tube, the ITO glass temperatures became saturated at 150 seconds. When the gas velocities through the single tube were 9.1 m/s and 15.2 m/s, the saturated temperatures of the ITO glass via plasma jet from the single conduit tube were 37° C. and 32° C., respectively. This temperature difference likely is due to neutral He gas flows. An acceleration of the gas velocity also resulted in a rapid increase of neutral He gas flow that quickly cooled the surface of the ITO glass.

Regarding the plasma jet array device, the ITO glass temperature becomes saturated at approximately 150 second at a gas velocity of 15.2 m/s (well-collimated plasma jet), and at 240 seconds at a gas velocity of 9.1 m/s (intense mode plasma jet), respectively. Gas velocities through the plasma jet array device at 9.1 m/s and 15.2 m/s yield saturated temperatures of 81° C. and 67° C., respectively. Though the input power and the distance between the powered and ground electrodes are identical, the saturated temperature on the ITO glass caused by plasma jet arrays is more two times greater than that with a single plasma jet, regardless of whether an intense plasma jet (9.1 m/s velocity) or a well-collimated plasma jet (15.2 m/s) was formed, as shown in FIG. 7.

EXAMPLE 4

Figure 8B:
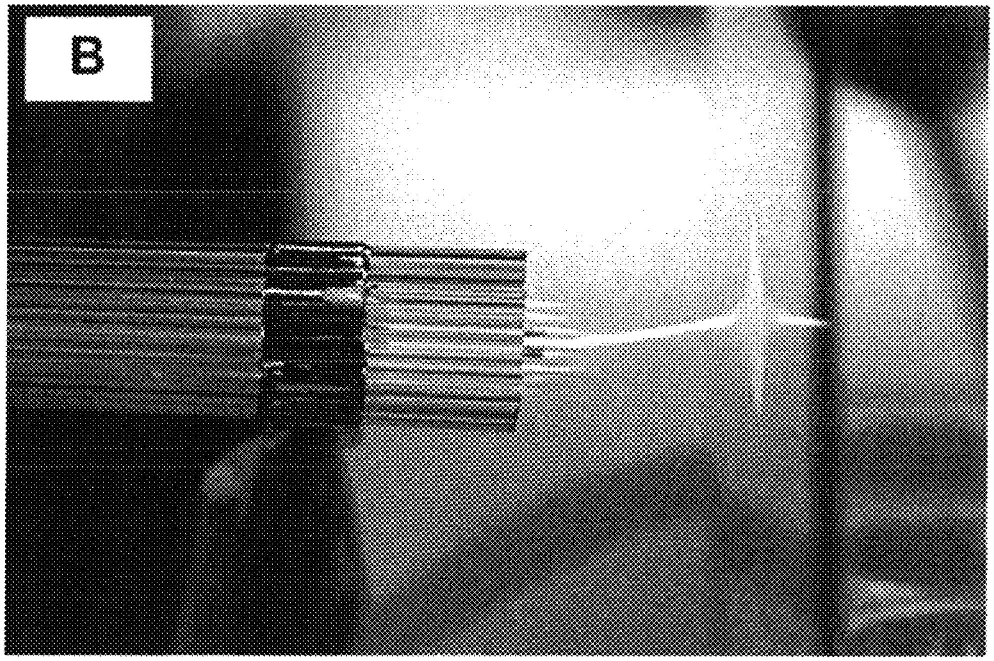
FIG. 8B is a photograph illustrating an intense mode plasma jet emitted from a 19-conduit array.
Figure 8C:
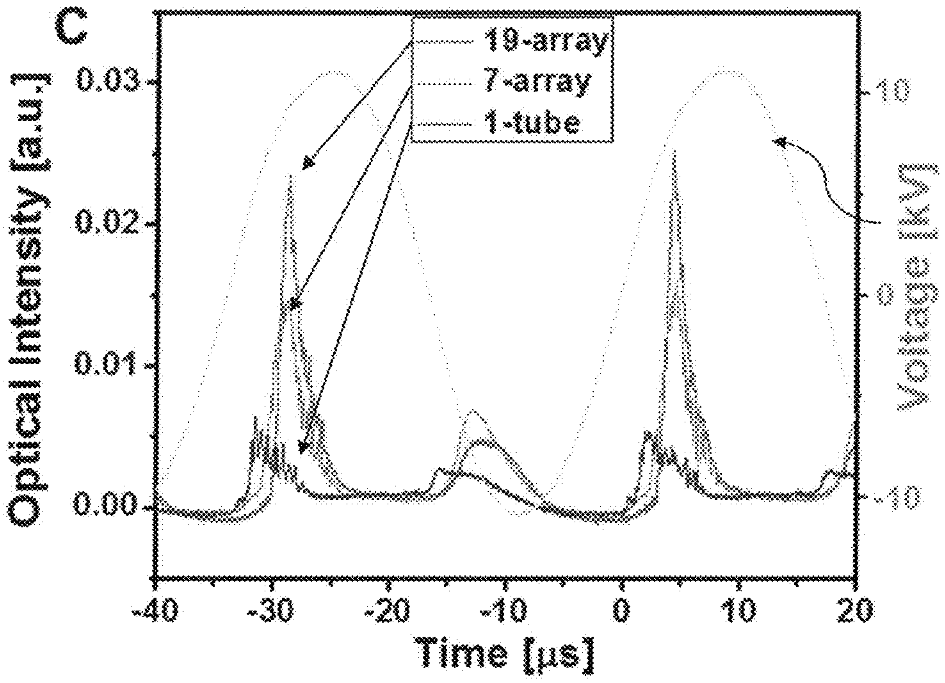
FIG. 8C is a graph comparing the optical intensity of an intense mode plasma jet emitted from a 19-conduit array, an intense mode plasma jet emitted from a 7-conduit array, and a plasma jet emitted from a single conduit.

As shown in FIGS. 8A-8C, the feasibility of forming a conduit tubing array with a 19-tube honeycomb structure was investigated. The plasma jet emissions from the 19-tube honeycomb structure were then compared to the plasma jet emissions from the 7-tube conduit tubing array of FIG. 2A and the single conduit tube introduced above. As shown in FIGS. 8A and 8B, the central conduit tube in the 19-tube conduit tubing array can protrude from the end of the conduit tubing by about 1 mm so that it is slightly closer to the surface to be treated. This configuration can allow for easier ignition of the plasma. Further, like the 7-tube conduit tubing array of FIGS. 2A and 2B, each tube of the 19-tube conduit tubing array can have an inner diameter of about 1 mm and an outer diameter of about 2 mm.

The intense plasma jet generated from the 19-tube conduit tubing array is shown in FIG. 8B. Note that the direct jet-to-jet coupling behavior present. Despite an equally distributed gas flow, the outermost tubes do not produce strong individual jets. Rather, the plasma flow from these tubes is drawn into the central jet, which is in turn amplified. Using a photo sensor amplifier, the plasma emission properties among the 19- and 7-conduit tubing array plasma jet devices and the single tubing plasma jet device were quantified and compared. While the input power of the applied sinusoidal voltage waveform was fixed to 28 W at 30 kHz, the gas flow rates of 19- and 7-arrays and a single jet were varied to 400 sccm (4.0 slm), 2500 sccm (2.5 slm), and 1000 sccm (1.0 slm), respectively, which are the experimentally optimized flow conditions for the maximum optical intensity of each plume under the same input power. As seen in FIG. 8C under these experimental conditions, the optical intensity of the plasma jets created by jet arrays increases with the number of tubes in the array. For instance, the 19-array yields a much greater optical intensity compared to the 7-tube array and the single tube. Compared to a single tube, a seven jet conduit tubing array possesses approximately triple the optical intensity, while the 19-tube array possessed almost five times the optical intensity. Further, the discharge delays of coupling effect, observed among the three devices, indicates that the coupling effect requires time for mutual interaction as shown in FIG. 8C.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention which is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A plasma jet system, the plasma jet system comprising:
- a gas source providing a plasma feed gas;
- a conduit tubing array, the array having an outer surface and comprising multiple hollow tubes each having a first end and a second end, wherein the first end of each hollow tube is in fluid communication with the gas source, wherein the multiple hollow tubes each include a dielectric material;
- a single plasma-generating electrode adjacent to the outer surface of the conduit tubing array, wherein the conduit tubing array prevents contact between the single plasma-generating electrode and the plasma feed gas;
- a ground electrode located external to the conduit tubing array; and
- a driving circuit for powering the system, wherein the plasma jet system is an atmospheric plasma jet system.

2. The plasma jet system according to claim 1, wherein the system is a portable system.

3. The plasma jet system according to claim 1, further comprising a gas source for supplying the plasma feed gas, wherein the plasma feed gas comprises at least one of helium and argon.

4. The plasma jet system according to claim 1, wherein the plasma feed gas has a linear gas velocity of from about 1 meter per second to about 100 meters per second.

5. The plasma jet system according to claim 4, wherein the plasma feed gas has a linear velocity of from about 4 meters per second to about 20 meters per second.

6. The plasma jet system according to claim 5, wherein a single, intense mode plasma jet is emitted from the conduit tubing array, wherein the intense mode plasma jet is formed by interaction between individual plasma jets emitted from each of the multiple hollow tubes.

7. The plasma jet system according to claim 1, further comprising a tubing material that connects the gas source to the first end of each hollow tube.

8. The plasma jet system according to claim 7, wherein the tubing material comprises silicone, polyurethane, polyethylene, polyvinyl chloride, polyvinyldifluoride, polyetherether ketone, or polysulfone.

9. The plasma jet system according to claim 1, wherein the conduit tubing array comprises from about 3 to about 200 hollow tubes.

10. The plasma jet system according to claim 1, wherein the multiple hollow tubes each have an inner diameter of from about 1 millimeter to about 10 meters and each have an outer diameter of from about 1.1 millimeters to about 20 meters.

11. The plasma jet system according to claim 1, wherein the multiple hollow tubes include a center tube, wherein the second end of the center tube extends a distance of from about 0.1 millimeters to about 1 meter beyond the second end of the remaining hollow tubes.

12. The plasma jet system according to claim 1, wherein the conduit tubing array has an overall diameter of from about 0.01 meters to about 40 meters.

13. The plasma jet system according to claim 1, wherein the conduit tubing array is formed of quartz tubes, glass tubes, or a combination thereof.

14. The plasma jet system according to claim 1, wherein the single plasma-generating electrode has an end to end length of from about 1 millimeter to about 1 meter.

15. The plasma jet system according to claim 1, wherein the single plasma-generating electrode has a first end closest to the gas source and a second end closest to the second end of each of the multiple hollow tubes, wherein the second end of each of the multiple hollow tubes extends beyond the second end of the single plasma-generating electrode by a distance of from about 3 millimeters to about 100 millimeters.

16. The plasma jet system according to claim 1, wherein the driving circuit applies a voltage of from about 1 kilovolts to about 1000 kilovolts in peak value to the system.

17. A method for treating a surface with an atmospheric plasma jet system, the method comprising:

forming a plasma within a conduit tubing array, wherein the conduit tubing array has an outer surface and comprises multiple hollow tubes each having a first end and a second end, wherein the multiple hollow tubes each include a dielectric material, the plasma being formed from a plasma feed gas and in an electric field developed at a single plasma-generating electrode adjacent to the outer surface of the conduit tubing array, wherein the conduit tubing array forms a dielectric barrier between the single plasma-generating electrode and the plasma feed gas to prevent contact between the single plasma-generating electrode and the plasma feed gas, wherein a ground electrode is located external to the conduit tubing array, and further wherein the plasma exits the second end of each of the hollow tubes as a single plasma jet, after which the single plasma jets (1) interact to form a single, intense mode plasma jet, wherein the intense mode plasma jet is formed by interaction between individual plasma jets emitted from each of the multiple hollow tubes or (2) form multiple, well-collimated plasma jets; and directing the intense mode plasma jet at the surface, wherein a driving circuit provides power to the system.

18. The method according to claim 17, wherein the surface is a glass side of a plate.

19. The method according to claim 17, wherein the surface is a distance of from about 1 millimeter to about 10 meters away from the second end of the multiple hollow tubes.

20. The method according to claim 17, wherein the plasma feed gas has a linear gas velocity of from about 1 meter per second to about 100 meters per second.

21. The method according to claim 20, wherein the plasma feed gas has a linear velocity of from about 4 meters per second to about 20 meters per second.

22. The method according to claim 17, wherein a single, intense mode plasma jet is emitted from the conduit tubing array, wherein the intense mode plasma jet is formed by interaction between individual plasma jets emitted from each of the multiple hollow tubes.

23. The method according to claim 17, wherein multiple, well-collimated plasma jets are emitted from the conduit tubing array.

24. The method according to claim 17, wherein the driving circuit applies a voltage of from about 1 kilovolts to about 1000 kilovolts in peak value to the system.

* * * * *